(12) United States Patent
Dufresne et al.

(10) Patent No.: US 7,934,676 B2
(45) Date of Patent: May 3, 2011

(54) PRE-FABRICATED ARTICLE FOR EME PROTECTION OF AN AIRCRAFT

(75) Inventors: Ralph E. Dufresne, Auburn, WA (US);
David F. Feider, Renton, WA (US);
Quynhgiao N. Le, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 369 days.

(21) Appl. No.: 12/056,139

(22) Filed: Mar. 26, 2008

(65) Prior Publication Data
US 2009/0001217 A1 Jan. 1, 2009

Related U.S. Application Data

(63) Continuation-in-part of application No. 11/770,263, filed on Jun. 28, 2007, and a continuation-in-part of application No. 11/935,993, filed on Nov. 6, 2007.

(51) Int. Cl.
*B64D 45/02* (2006.01)

(52) U.S. Cl. .......... 244/1 A; 244/133; 361/218

(58) Field of Classification Search .......... 244/1 A, 244/121, 129.1, 133; 361/218
See application file for complete search history.

(56) References Cited

U.S. PATENT DOCUMENTS

| | | | | |
|---|---|---|---|---|
| 3,906,308 A | * | 9/1975 | Amason et al. | 361/218 |
| 3,989,984 A | * | 11/1976 | Amason et al. | 361/212 |
| 4,352,142 A | * | 9/1982 | Olson | 361/218 |
| 4,789,918 A | * | 12/1988 | Bannink, Jr. | 361/218 |
| 4,796,153 A | * | 1/1989 | Amason et al. | 361/218 |
| 5,845,872 A | | 12/1998 | Pridham et al. | |
| 7,277,266 B1 | * | 10/2007 | Le et al. | 361/218 |
| 2005/0150596 A1 | | 7/2005 | Vargo et al. | |
| 2007/0093163 A1 | | 4/2007 | Brown | |

FOREIGN PATENT DOCUMENTS

| | | |
|---|---|---|
| EP | 1 473 227 A A2 | 11/2004 |
| EP | 1 767 344 A2 | 3/2007 |
| WO | 01/39253 A2 | 5/2001 |
| WO | 2004/106160 A1 | 12/2004 |

OTHER PUBLICATIONS

Gardiner, Ginger, "Lightning Strike Protection for Composite Structures," http://www.compositesworld.com/hpc/issues/2006/July/1366, (Jul. 2006).

* cited by examiner

*Primary Examiner* — Rob Swiatek

(57) ABSTRACT

A pre-fabricated article for a composite aircraft component includes a dielectric layer and a pre-fabricated metalized pattern on the dielectric layer. The metalized pattern is fabricated on the dielectric layer prior to integration with the composite aircraft component. The metalized pattern diverts EME current away from EME protection areas of the aircraft component.

30 Claims, 14 Drawing Sheets

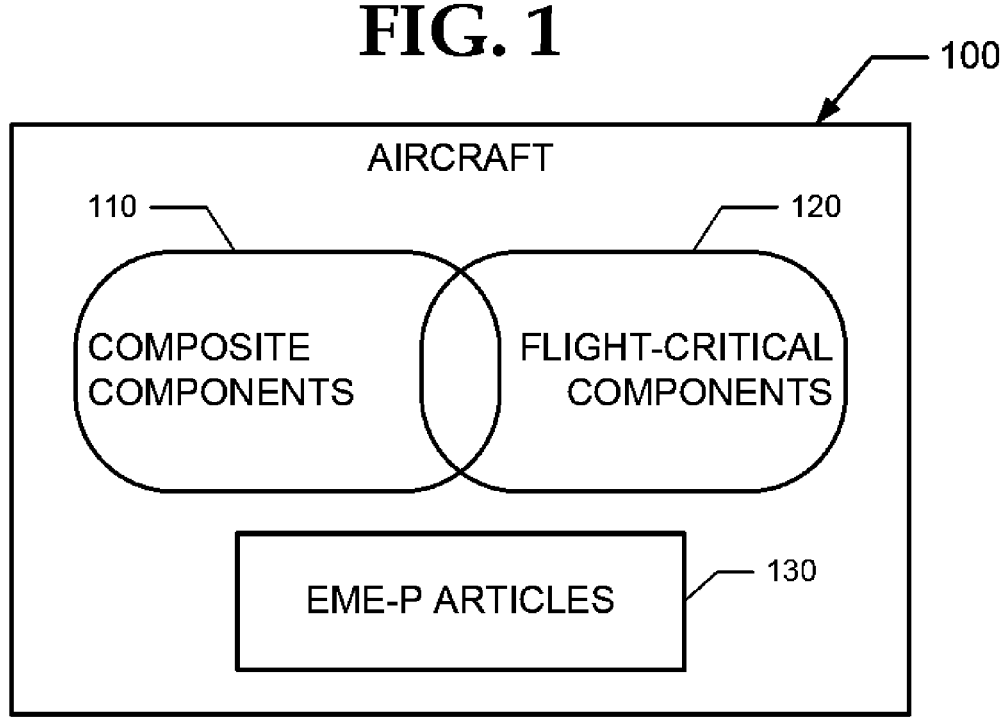
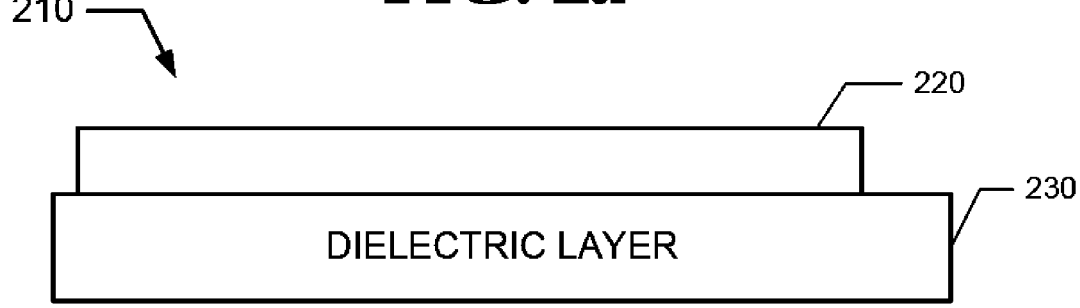

FIG. 8
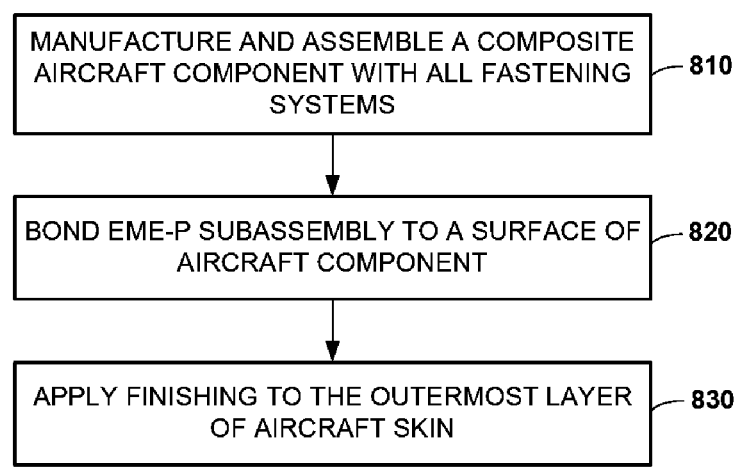
FIG. 9a
FIG. 9b
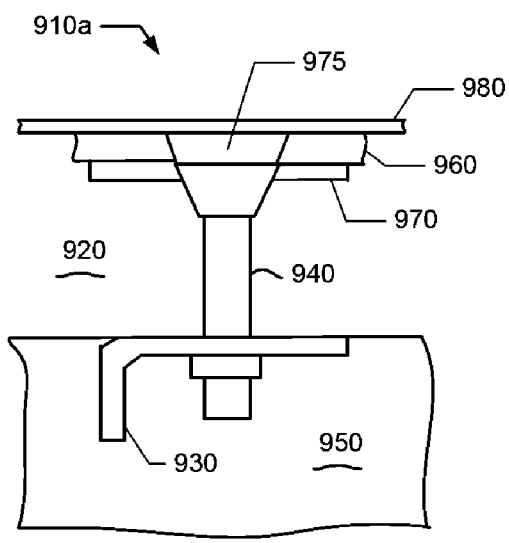
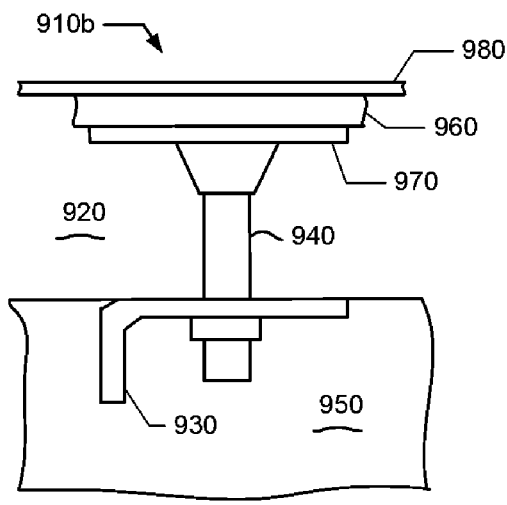

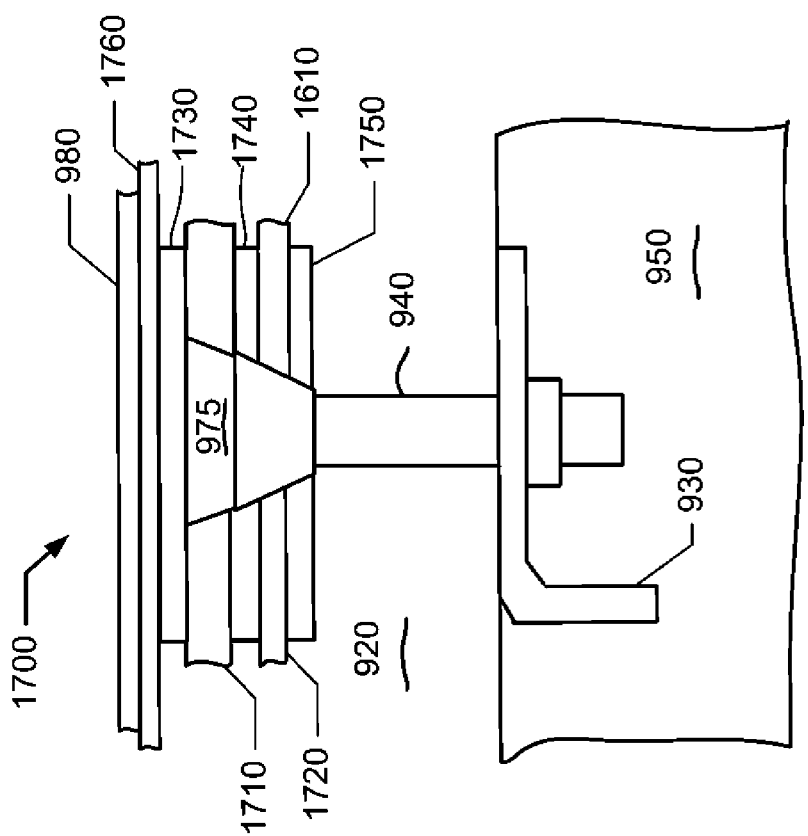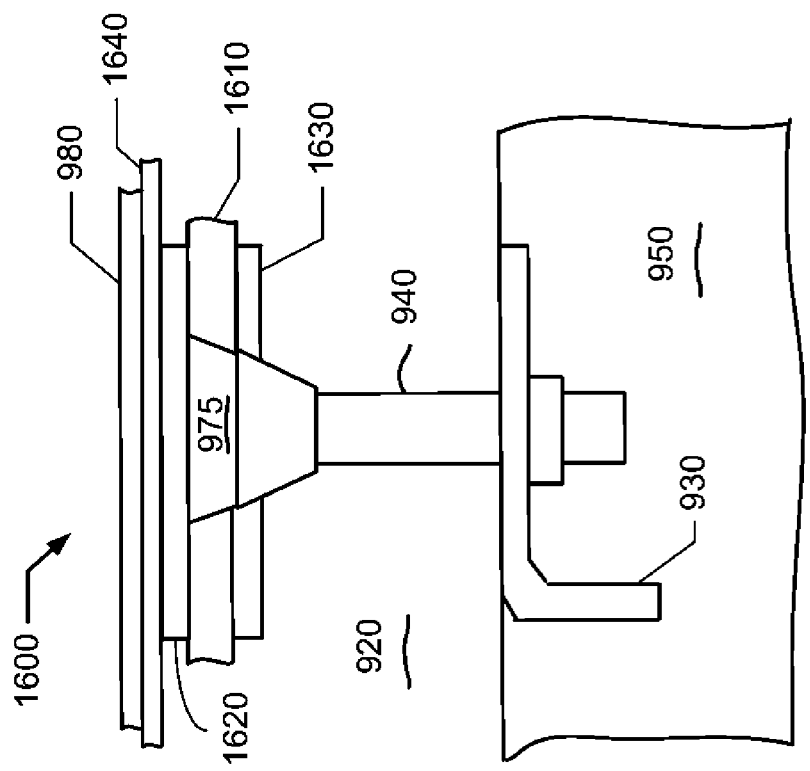

PRE-FABRICATED ARTICLE FOR EME PROTECTION OF AN AIRCRAFT

BACKGROUND

General aviation aircraft and large commercial jets are vulnerable to lightning strike. Unlike aircraft structures made of metal, composite structures do not readily conduct away the extreme electrical currents and electromagnetic forces generated by lightning strikes.

To ensure safety of flight, aircraft with composite structures may be equipped with lightning strike protection (LSP) features. For example, conductive media can be provided on a surface of or embedded in a composite structure to divert current away from metal fasteners and other flight-critical components.

SUMMARY

According to an embodiment of the present invention, a pre-fabricated article for a composite aircraft component includes a dielectric layer and a pre-fabricated metalized pattern on the dielectric layer. The metalized pattern is fabricated on the dielectric layer prior to integration with the composite aircraft component. The metalized pattern diverts electromagnetic effects (EME) current away from EME protection areas of the aircraft component.

According to another embodiment, a pre-fabricated subassembly includes a plurality of articles joined together to provide EME protection for a major aircraft component. The articles are joined prior to integration with the major aircraft component. Each article includes a dielectric layer and a pre-fabricated metalized pattern on the dielectric layer. The metalized pattern is customized to divert lightning current away from flight critical components of the major aircraft component.

According to another embodiment, an aircraft component includes a composite skin having holes for metal fasteners, and a subassembly for providing EME protection for metal fasteners in the holes. The subassembly includes at least one metallic laminate having a dielectric layer and a metalized pattern thereon. The metalized pattern is designed to divert and distribute current away from the metal fasteners in the holes. The metalized pattern is fabricated prior to integration with the component.

BRIEF DESCRIPTION OF THE DRAWINGS

FIG. 1 is an illustration of an aircraft.

FIG. 2a is an illustration of an article for providing EME protection for an aircraft.

FIG. 8 is an illustration of a method of fabricating a composite aircraft component with EME protection.

FIG. 9a is an illustration of a wing that was fabricated according to the method of FIG. 7.

FIG. 9b is an illustration of a wing that was fabricated according to the method of FIG. 8.

FIGS. 16 and 17 are illustrations of wings having multi-level EME protection subassemblies.

DETAILED DESCRIPTION

Figure 2B:
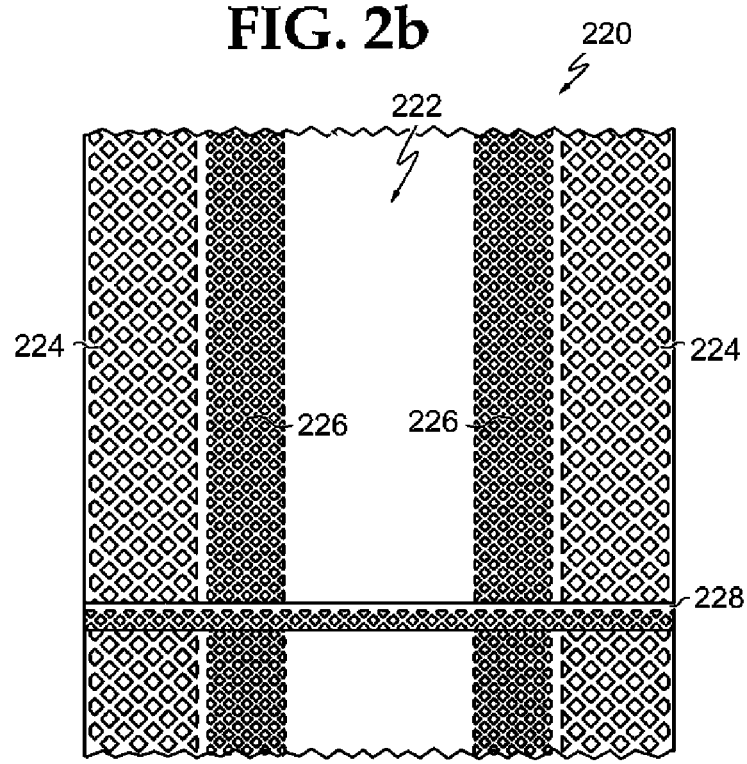
FIGS. 2b-2c are illustrations of different patterns for the article.

Reference is made to FIG. 1, which illustrates an aircraft 100 including a plurality of composite components 110. Composite components 110 such as skins, ribs, spars and stringers are joined together to form major components such as wings, fuselage and empennage. The composite components 110 may include a composite material such as fiberglass or Carbon Fiber Reinforced Plastic (CFRP).

The aircraft 100 also includes flight-critical components 120. Flight-critical components in general are components that affect the flight-worthiness of the aircraft 100. Examples of flight-critical components 120 include, without limitation, communication and control electronics, cut edges of composite materials that can spark (i.e., expel pyrolyzed materials) or glow under influence of lightning currents, and certain metal fasteners. Certain composite components 110 might also be flight-critical; thus the overlap shown in FIG. 1.

Most metal fasteners are used to fasten structural components together. For example, the composite skin of a wing may be fastened to a wing frame (e.g., an assembly of spars, stringers and ribs) with metal fasteners. Some of these fasteners will terminate in a wing tank.

During flight, the aircraft 100 is vulnerable to lightning strike and other electromagnetic effects (EME). Composites, being far less conductive than aluminum, cannot as quickly distribute current and heat well enough to prevent deflagration, pyrolization and degradation of composite materials, and incandescent events such as sparking, arcing and edge glow.

Some of the composite components 110 are provided with one or more pre-fabricated articles 130 that provide protection against lightning strike and other forms of EME. These pre-fabricated articles 130, when assembled to their composite components 110, divert and distribute high EME currents away from flight-critical components 120. The diverted current is distributed over a larger area so that dangerous concentrations do not develop in any one place. For instance, current from a lightning strike is distributed sufficiently so that arcing, sparking, pyrolization or other modes of ignition and damage do not affect flight-critical components 120.

Reference is now made to FIG. 2a, which illustrates a pre-fabricated article 210 for providing EME protection (EME-P) of an aircraft component. The article 210 includes a pre-fabricated metalized pattern 220 on a dielectric layer 230. The metalized pattern 220 is designed to divert and distribute EME current away from metal fasteners and other flight-critical components. The article 210 is pre-fabricated in that it is fabricated prior to integration with a composite component.

The metalized pattern 220 may be designed to cover (that is, be directly over) flight-critical components. However, covering a flight critical component might not be necessary. Sufficient EME protection might be achieved if the metalized pattern 220 is designed to be proximate of a flight-critical component.

The metalized pattern 220 may be pre-fabricated with a customized thickness prior to integration with the component. The metalized pattern 220 may be made thicker or may have a denser pattern over fastener locations and other flight-critical composite areas. As the metalized pattern 220 extends away from a flight-critical component, thickness of the metal can be reduced. The degree of EME protection is perhaps more a function of metal mass, which in turn depends on pattern density. More metal results in less electrical resistance to the distribution of EME current, and also provides greater heat capacity, thus resulting in longer life (measured in micro seconds) before burning up.

The metalized pattern 220 may be custom-designed to provide EME protection in accordance with specific criteria unique to each application. Criteria include 1) the vulnerability of a flight-critical component or nearby area to lightning damage; 2) frequency of strikes, (which occur with greater frequency on certain structural components); 3) expected level of EME current; and 4) probable effect on flight worthiness. For example, a metal fastener terminating in a fuel tank would be provided with the highest degree of EME protection.

An example of a custom-designed pattern is illustrated in FIG. 2b. In some embodiments, however, a standard metalized pattern may be used. An example of a standard metalized pattern is illustrated in FIG. 2c.

The dielectric layer 230 has dielectric and material properties chosen for specific areas of application. Different layers may have varying degrees of flexibility to fit aircraft composite tooling contours and provide a strong and stable platform for handling the metalized pattern 220 during manufacture and assembly. Thus, some articles 210 may be flexible, while other articles 210 are rigid. The dielectric layer 230 provides other advantages, which will be described below.

FIG. 2b shows an example of a custom-designed pattern for providing EME protection for rows of metal fasteners. The metalized pattern 220 includes solid metal (e.g., copper) 222 along the fastener row locations, and more open patterns 224, 226 away from fasteners locations. The solid metal will effectively divert current away from fasteners rows. The patterns 224, 226 away from the fasteners, where current densities are less, are open to minimize weight. The open metalized patterns 224, 226 may also improve the handling characteristics and make the article more amenable to automated handling. Further, the metalized pattern 220 may have expansion joints 228 at suitable intervals to alleviate thermal and mechanical stresses. The expansion joints 228 may be electrically conductive.

Figure 2C:
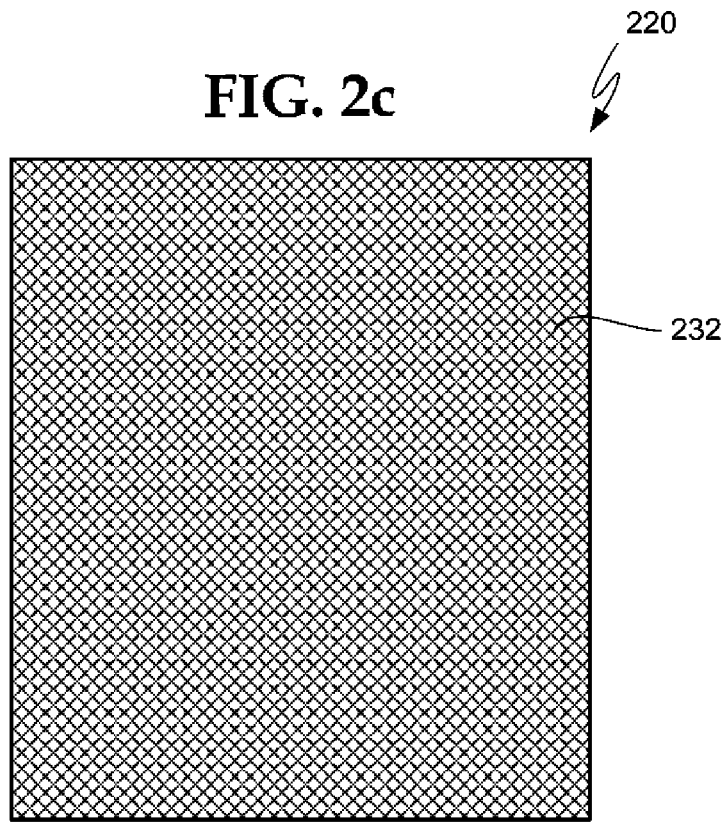

FIG. 2c shows an example of metalized pattern 220 having a standard design: a mesh 232. The mesh pattern 220 can prevent lightning "punch through" in relatively thin areas of aircraft skin.

Even a standard pattern can be customized. For instance, thickness and density of the mesh pattern can be varied to meet specific EME protection criteria.

Figure 10:
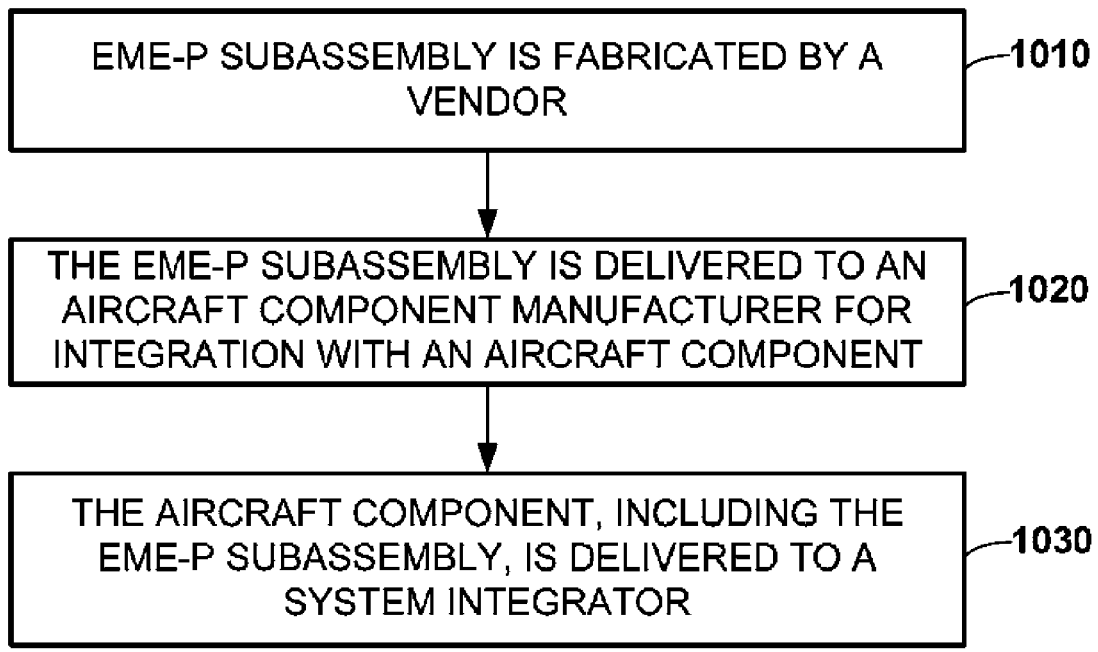
FIG. 10 is an illustration of how an EME protection article may be used in a large commercial aircraft.

Reference is made to FIG. 10, which provides an overview of how the article may be used in a large commercial aircraft. At block 1010, an EME-P subassembly is fabricated by a vendor. In some embodiments, the EME-P subassembly may include a single article that provides EME protection for a major aircraft component (e.g. a wing). In other embodiments, the EME-P subassembly may include a plurality of articles that are joined together to provide EME protection for a major aircraft component (as described below).

At block 1020, the EME-P subassembly is then delivered to a manufacturer of the aircraft component, where the EME-P subassembly is integrated with the aircraft component. The EME-P subassembly may be integrated with the component according to FIG. 7 or FIG. 8.

At block 1030, the component, which includes the EME-P subassembly, is then delivered to a system integrator (e.g., an aircraft manufacturer). In some instances, the component manufacturer and the system integrator will be the same entity.

Figure 3:
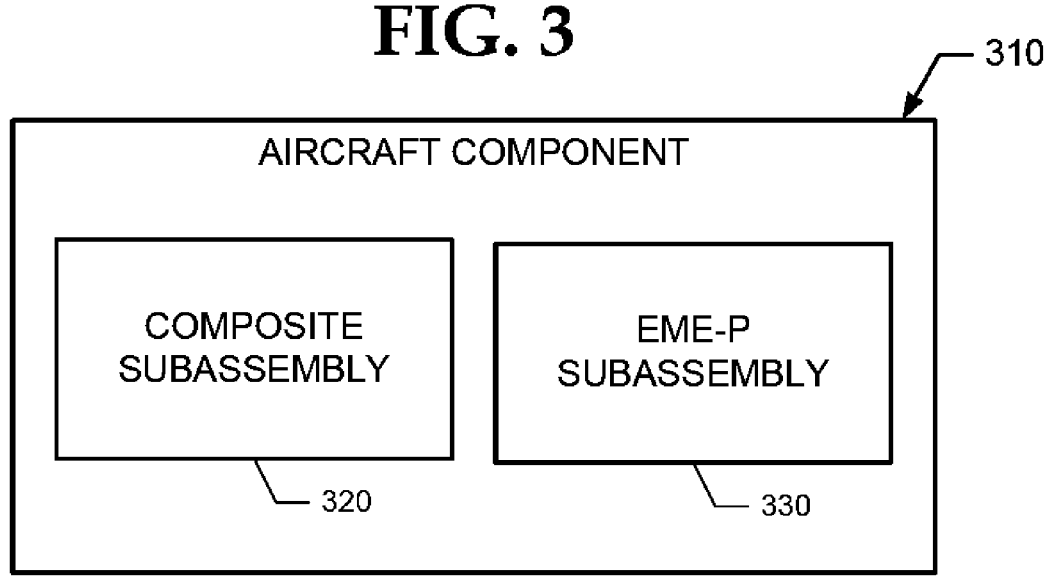
FIG. 3 is an illustration of an aircraft component.

Reference is now made to FIG. 3. An aircraft component 310 includes a plurality of subassemblies that are assembled during manufacture. This plurality of subassemblies includes a composite subassembly 320, and an EME protection subassembly 330 including at least one EME-P article.

The composite subassembly 320 may consist of a single composite component, or it may include multiple composite components. As a first example, the composite subassembly consists of composite skin. As a second example, the composite subassembly includes a wing made up of spars, stringers, ribs and skin.

The EME-P subassembly 330 may include a single EME-P article, or it may include multiple EME-P articles that are joined together. In some embodiments, a single EME-P article may provide lightning strike protection or other EME protection for the component. For example, a single article may be made large enough to provide EME-P protection over the entire skin of a wing. The metalized pattern may be custom-designed through variations of thickness, width, and shape to provide EME protection for the component.

In other embodiments, the EME-P subassembly includes a plurality of EME-P articles. Consider a major aircraft component or other component that is extremely large. An EME-P subassembly for a large component may be fabricated from several smaller articles that are joined together.

Figure 4:
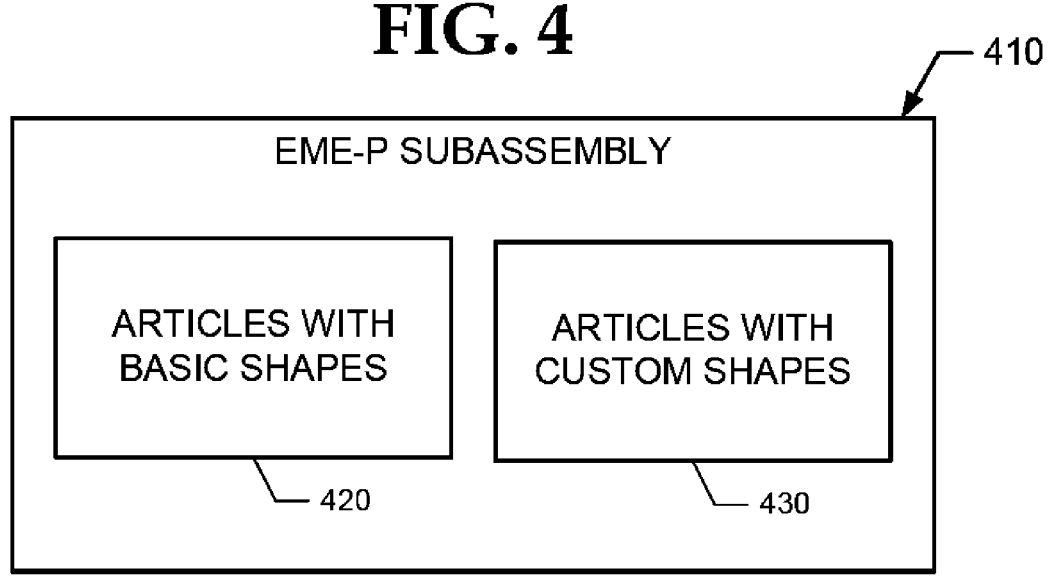
FIG. 4 is an illustration of an EME protection subassembly.

Reference is now made to FIG. 4. Now consider a component having a complex shapes or contours. An EME-P subassembly 410 for such a component may be fabricated from articles 420 having basic shapes (e.g., long straight runs) and articles 430 made to fit any degree of in-plane or complex curvature. The articles 420 and 430 are joined together. For example, an EME-P subassembly for a wing might include a plurality of articles in long straight runs and other articles having customized shapes for covering curved portions, specific contours, complex surfaces, compound (spherical) curvature etc.

Figure 5:
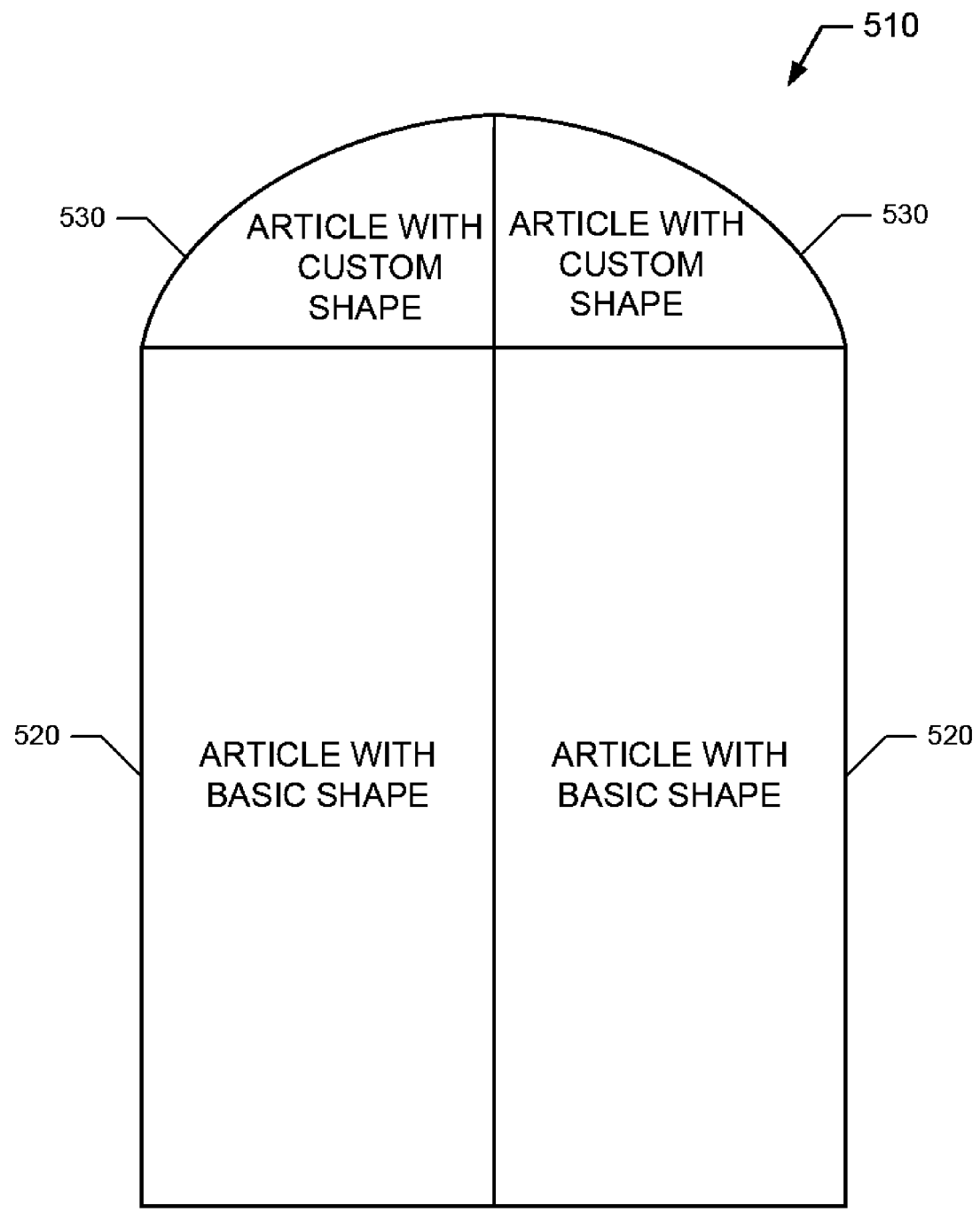
FIG. 5 is an illustration of an EME protection subassembly.

Reference is now made to FIG. 5. FIG. 5 is not intended to portray an actual EME-P subassembly. FIG. 5 simply illustrates that articles 520 with basic shapes and articles with custom shapes 530 are joined together to form an EME-P subassembly 510.

Figure 6:
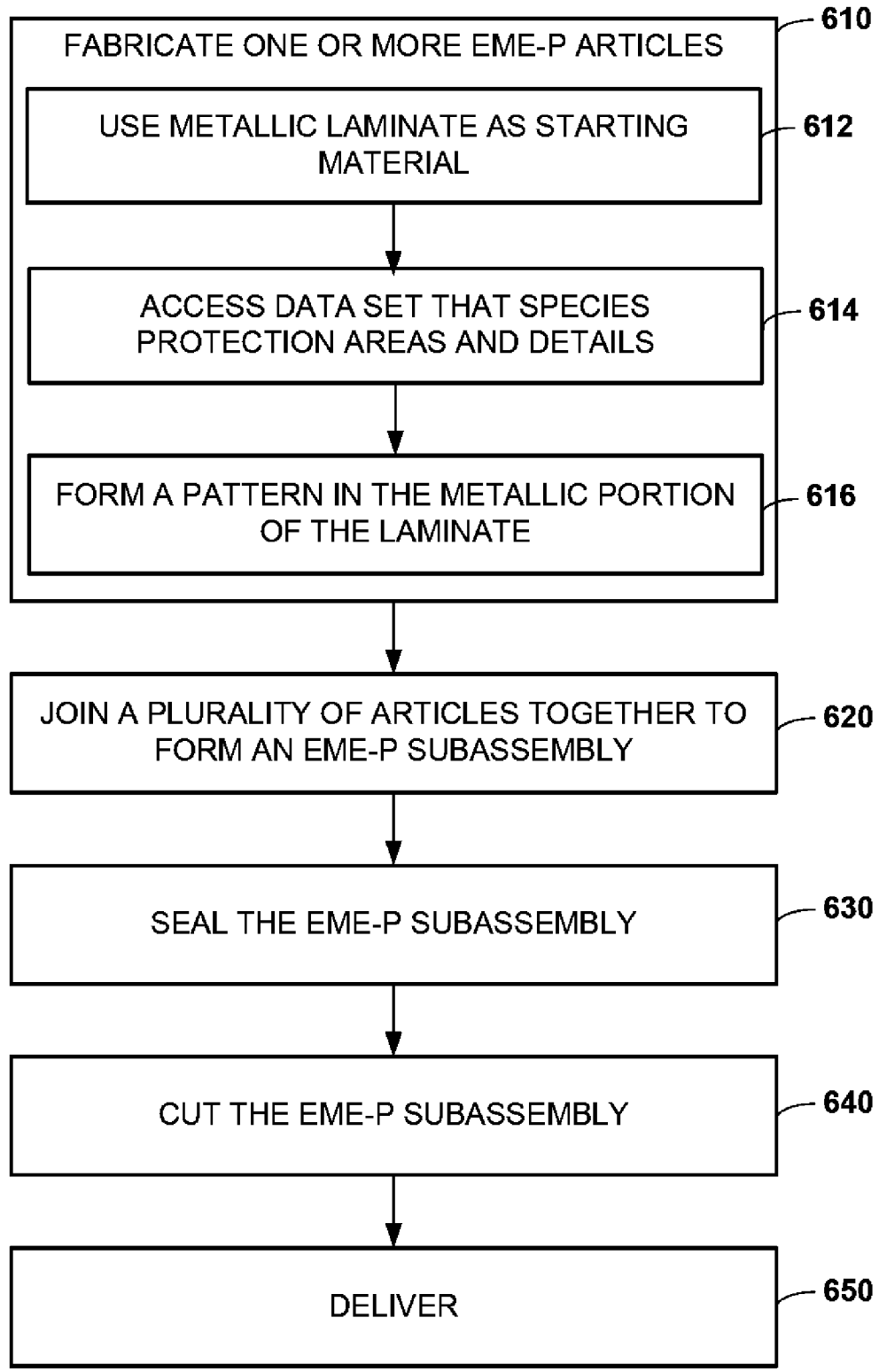
FIG. 6 is an illustration of a method of fabricating an EME protection subassembly.

Reference is now made to FIG. 6, which illustrates a method of fabricating an LSP subassembly. At block 610, one or more EME-P articles are fabricated. Each EME-P article is for a specific aircraft model and component, and for a specific location on the component.

The aircraft component has "protection areas." These protection areas are areas from which EME current will be diverted and distributed. When an EME-P subassembly is integrated with a component, the metalized patterns will divert and distribute EME current away from the protection areas and, therefore, away from flight-critical components. For example, protection areas include areas over and proximate to flight critical components.

Each article may be fabricated according to blocks 612-616. At block 612, a stock metallic laminate may be used as a starting material. The laminate may include a metallic foil on a dielectric substrate. The metal may be copper, aluminum, or other suitable metal, or a combination thereof. The foil may have an initial thickness of no more than a few thousandths of an inch. In some embodiments, the metal may have a thickness of in the range of 0.0005 to 0.003 inches. A copper foil having a thickness of 0.0005 to 0.003 inches is very flimsy and difficult to handle if not supported by a substrate. Laminates with various metal thicknesses are chosen in accordance with specific requirements for EME protection.

The dielectric substrate provides durability, flexibility and strength for handling the foil. The dielectric substrate may be made of a material such as polyimide, epoxy, fluorocarbons, fiberglass, or any other durable material that is compatible with the composite material of the aircraft structure. Typical thickness for the dielectric substrate is 0.001 to 0.005 inches.

At block 614, a data set is accessed. The data set specifies the layout of the metalized pattern. For example, the data set may include an image of the metalized pattern. The image may be a computer-generated pattern designed by EME Engineering in accordance with requirements for EME protection in a specific application. The data set may also specify thicknesses of the metalized pattern. When an article is integrated with its composite component, the metalized pattern will divert and distribute EME current away from the protection areas.

At block 616, the metalized pattern is formed in the metallic portion of the laminate. The metalized pattern may be formed by etching an image of the pattern. Conventional photoimaging and pattern etching techniques may be used, such as those for circuit board manufacture. However, other techniques may be used to create the metalized pattern on the laminate. Variations in thickness in the pattern can also be achieved by photoimaging and etching.

At block 620, a plurality of the articles are joined together to form a single subassembly that will provide EME protection for a component. The articles may be joined, for example, by H clips, cleats, tape or other techniques compatible with electrical, structural, and material requirements for specific components. H-clips, which provide certain advantages, will be described below.

At block 630, the EME-P subassembly is sealed to protect sensitive elements (e.g. joints, conductive surfaces etc.) from contamination or damage. Sealing may be accomplished by overlaying and curing a thin layer of fiberglass over the entire subassembly. However, the EME-P subassembly may be sealed by other means compatible with the functionality of the composite subassembly in the aircraft component.

At block 640, the EME-P subassembly is optionally trimmed or cut to shape for application to specific locations and tool geometries.

At block 650, a single EME-P subassembly is delivered to a component manufacturer. In the alternative, the individual articles that make up an EME-P subassembly may be delivered to a component manufacturer and pieced together during manufacture of the component.

Figure 7:
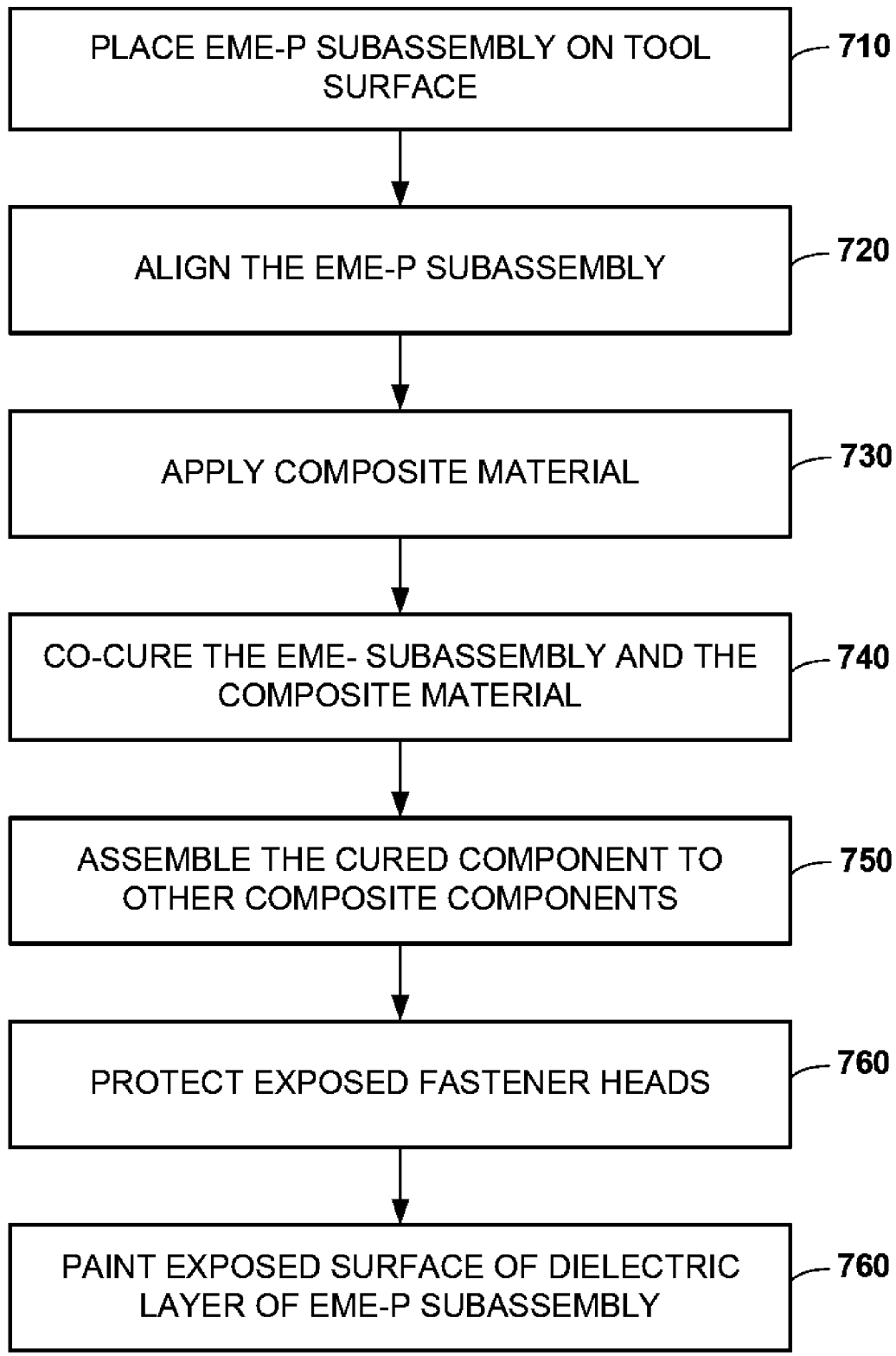
FIG. 7 is an illustration of a method of fabricating a composite aircraft component with EME protection.

Reference is now made to FIG. 7, which illustrates a first method of fabricating a composite component. In this first method, an EME-P assembly will be co-cured with a composite structure.

A tool will be used to integrate the EME-P subassembly and the composite subassembly. A tool as used herein refers to a large, precision-made surface on which aircraft composite parts are formed and built. The tool typically has the inverse shape of the finished component. Thus, the tool surface matches the outer surface of the component.

At block 710, an EME-P subassembly is placed on the tool surface as a first layer of the component. Preferably, the dielectric layer is placed against the tool surface (as it will form the outer surface of the component). The EME-P subassembly may be placed on the tool by hand or by an automated method.

At block 720, the EME-P subassembly is aligned on the tool surface. For example, the EME-P subassembly may be aligned by using templates, indexing, laser alignment or some other alignment technique. Once aligned, the patterned metallization in the EME-P subassembly will be correctly positioned with respect to protection areas and, therefore, flight-critical components.

The EME-P subassembly may also be adhered or otherwise fixed to the tool in order to facilitate subsequent operations. Resin or some other adhesive may be used.

At block 730, composite material (e.g., resin-impregnated carbon fiber layers) is applied to the tool. For example, an automated tape laying machine may be used to automatically apply layers of carbon fiber, fiberglass or other material on top of the EME-P subassembly.

At block 740, the EME-P subassembly is co-cured with the composite material. For instance, the component is cured under high temperature and pressure in an autoclave. In the cured structure, the EME-P subassembly is exposed on the outer surface. In particular, the dielectric layer of the EME-P subassembly may, in some embodiments, function as the outermost layer of the aircraft skin structure. As a result of the co-curing the dielectric layer becomes an integral part of the aircraft skin and will become quite rigid.

At block 750, holes are drilled through the cured component, metal fasteners are inserted into the holes, and the cured component is assembled to other components. Metal fasteners will extend through the cured component. However, the metalized pattern in the EME-P subassembly will be able to divert lightning current away from those fasteners.

At block 760, the exposed fastener heads may be further protected from direct lightning attachment. For example, the exposed heads can be covered with a dielectric sealant.

At block 770, the exposed surface of the dielectric layer of the EME-P subassembly is primed and painted. In the alternative, a surfacing film is applied to the exposed dielectric surface, and the surfacing film is painted. The surfacing film may also be laid up and co-cured with the EME-P subassembly In some embodiments, the EME-P subassembly could be embedded between composite layers. However, important advantages are realized by using the EME-P subassembly as an outermost layer of the composite component. Positioned as such, the dielectric layer of the EME-P subassembly provides a tough exterior layer for protection of the underlying structure. The dielectric layer also prevents interaction between the metalized pattern and the paint system. Interaction between the paint system and the metalized pattern could cause cracks in the paint system and subsequent ingress of corrosive agents into the subassembly.

Reference is now made to FIG. 8, which illustrates a second method of fabricating a composite component. In this second method, the EME-P assembly is post-applied to a cured and assembled composite component.

At block 810, an aircraft component (e.g., a major component such as a wing) is manufactured and assembled without the EME-P subassembly. The component is assembled with all fastening systems (e.g., metal fasteners).

At block 820, an EME-P subassembly is bonded to a surface of the aircraft component. For example, the EME-P article can be thermally bonded to the aircraft component. In some embodiments, the dielectric layer of the EME-P subassembly is exposed and thus functions as the outermost layer of the aircraft skin structure.

At block 830, finishing is applied to the outermost layer of the aircraft skin structure. In some embodiments, the outermost layer is primed and painted. In other embodiments, a surfacing film (e.g., a glass-epoxy layer) is applied to the outermost layer, and the surfacing film is painted Reference is now made to FIGS. 9a and 9b, which contrast a component 910a produced by the method of FIG. 7 to a component 910b produced by the method of FIG. 8. Both components 910a and 910b are a wing. Each wing 910a and 910b includes a CFRP skin 920 fastened to a substructure (represented by the bracket) 930 by metal fasteners 940. The skin 920 defines a fuel tank 950.

Each wing 910a and 910b further includes an EME-P subassembly including a dielectric layer 960 and metalized pattern 970 on the dielectric layer 960. The metalized pattern 970 intercepts the bulk of the lightning energy, diverts and distributes it, and prevents any significant current from reaching the fasteners 940. In this manner, the EME-P subassembly prevents excessively high fastener currents which can cause arcing, sparking or other ignition sources, especially in fuel tank areas.

For a wing 910a manufactured according to FIG. 7, the fasteners 940 extend through the EME-P subassembly. Dielectric sealant 975 covers the fasteners 940, and the dielectric sealant 975 and dielectric layer 960 are covered with paint system 980.

For a wing 910b manufactured according to FIG. 8, the fasteners 940 are covered by the metallization 970 and the dielectric layer 960. The fastener 940 therefore does not have to be sealed because the EME-P directly covers the fastener head, thus protecting it from direct lightning attachment.

The methods of FIGS. 7 and 8 offer different advantages. In the method of FIG. 7, the EME-P subassembly is co-cured into, and becomes an integral part of, the aircraft wing itself. This results in less exposure of EME-P components to exterior environmental degradation. On the other hand, in the method of FIG. 8, the fasteners 940 are protected from direct lightning attachment without the need for sealing or other measures. This results in reduced manufacturing costs. In addition, more metal mass is directly over the fasteners 940, which results in lower current in the fastener and substructure and, subsequently, less probability of damage.

Moreover, the method of FIG. 8 can be applied to the assembly of major components. For example, the LSP subassembly could be bonded over fasteners that attach one major component to another major component (e.g., a wing to a fuselage).

A method according to an embodiment of the present invention is not limited to co-curing an EME-P subassembly with, or thermally bonding an EME-P subassembly to, an aircraft component. In some embodiments, an EME-P subassembly might be applied to an aircraft as appliqué bonded to the skin with a pressure sensitive adhesive.

An EME-P subassembly provides advantages other than functioning as a component skin and isolating the metalized pattern from the paint system. An EME-P subassembly can be manufactured by a party who specializes in that field, and then delivered to an aircraft component manufacturer as a precision-made, fully cured and sealed sub-assembly. Once delivered, the EME-P subassembly can be integrated with other subassemblies to create a component having EME protection.

Thus, the implementation of EME protection as a subassembly relieves the component (e.g., wing) manufacturer or the aircraft integrator of the tedious and specialized technology for detailed manufacture of the subassembly itself. Rather, an EME-P subassembly can be manufactured by a company specializing in such technology.

The use of prefabricated EME-P subassemblies can significantly reduce flow time for component manufacture. The component manufacturer does not have to piece together an ad-hoc EME protection system during component (e.g., wing) manufacture.

Pre-fabricated patterning offers advantages. The patterning offers precision control of the quantity and pattern of metallization. Weight can be reduced by using open areas and varying the thickness of the metal. Reducing the weight results in lower aircraft fuel consumption and lower aircraft emissions.

Another advantage of custom designed metalized patterns is that the patterns can be customized to provide electrical connectivity for multifunctional applications. For instance, metalized patterns can provide electrical conductivity for tuned conductor circuitry specifically designed and optimized for specific application areas. An EME-P subassembly may also provide aircraft designers with a stable, expandable platform, with all necessary connectivity, for addition and incorporation of conductor patterns needed for a variety of applications, such as embedded sensing.

Non-limiting examples of sensors and components connected by an EME-P subassembly include embedded passive readout devices (EPRDs), embedded active readout devices (EARDs), Rogowski coils for current measurement, thermopiles, thermistors, fuses, radio frequency identification devices (RFIDs) and strain gauges. These sensors and components can provide a variety of applications in communications, mitigation of electromagnetic interference (EMI), real time monitoring of the health and condition of flight-critical components and other aircraft systems, real time monitor of temperature and mechanical excursions, de-icing circuitry, and tuned antenna networks.

Figure 13:
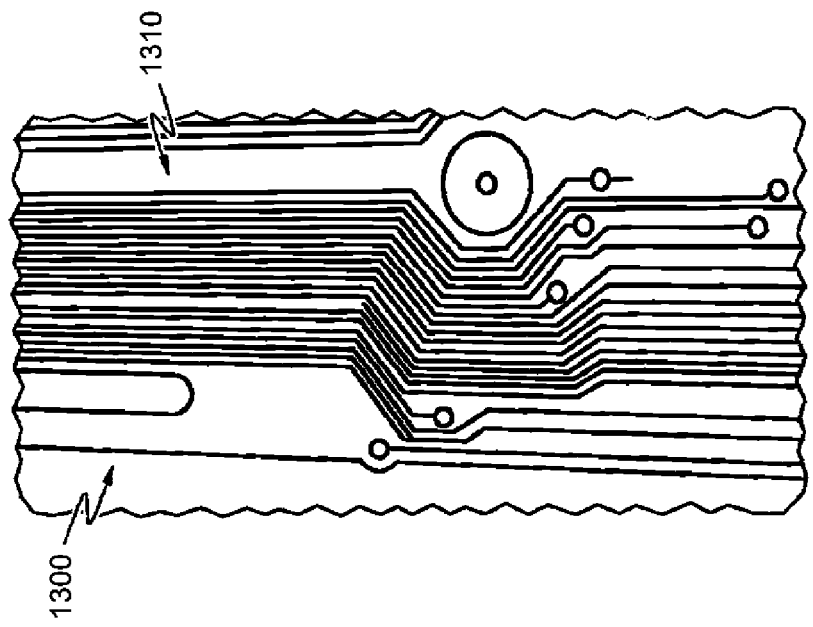
FIGS. 11-13 are illustrations of EME protection articles having metallization patterns.
Figure 12:
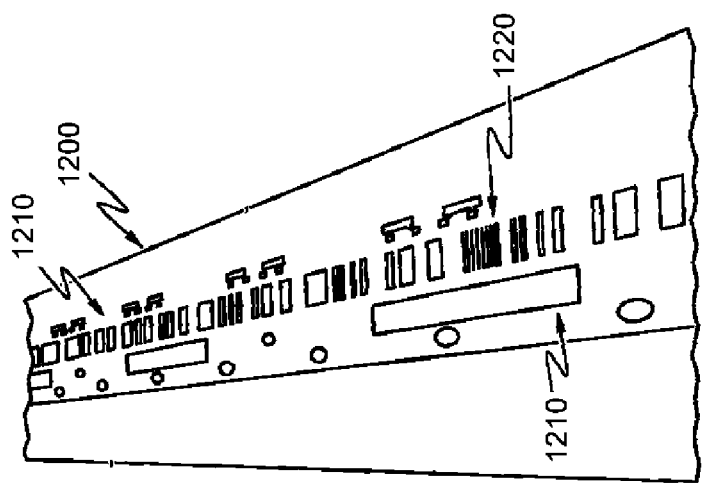
Figure 11:
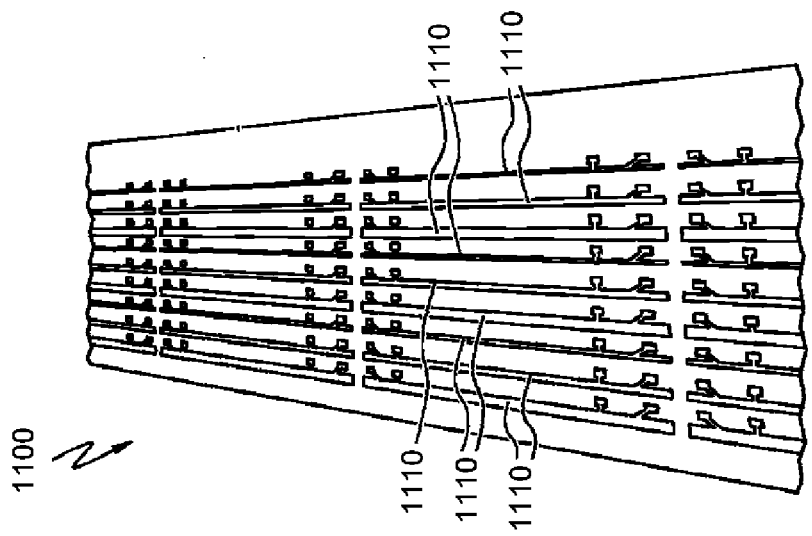

FIGS. 11-13 illustrate articles 1100, 1200 and 1300 with different patterns 1110, 1210, and 1310 that could be used for providing electrical connectivity for multifunctional applications. These applications may include without limitation, real time monitor of temperature and mechanical excursions, condition of critical lightning protection features, de-icing circuitry, and tuned antenna networks. The pattern 1210 of FIG. 12 may include, for example, antennas 1220 for embedded radio frequency (RF) devices.

In some embodiments, an aircraft component may be provided with multiple levels of articles. Multiple levels can offer advantages, such as multiple paths for diversion of lightning.

Figure 14:
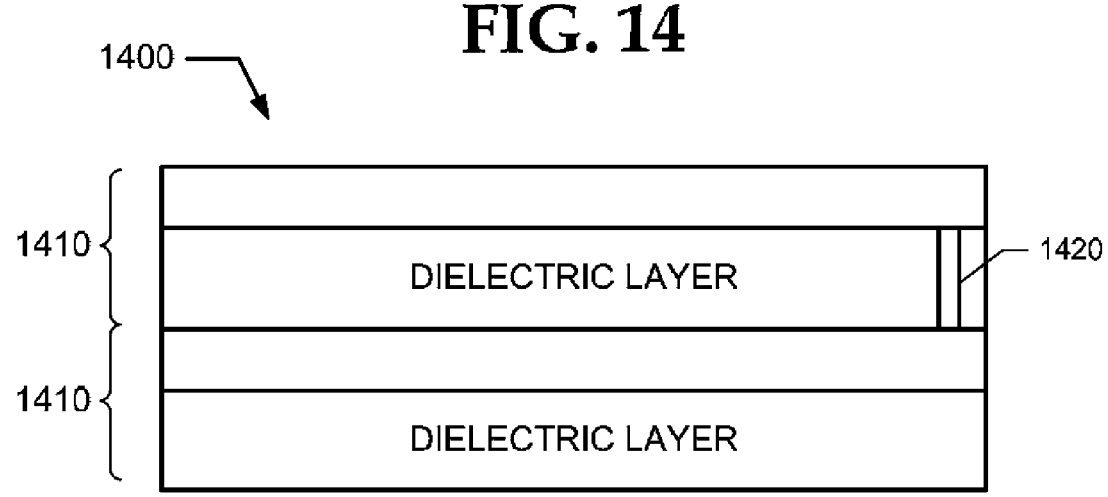
FIGS. 14 and 15 are illustrations of multi-level EME protection subassemblies.

Reference is now made to FIG. 14, which illustrates a subassembly 1400 having two levels of articles 1410. Electrical isolation between adjacent levels may be controlled by interposing a dielectric film between them. Electrically connectivity between levels might not be needed in order to divert and distribute EME current. However, selective transfer of signals for multifunction applications may be provided by suitable electrical interconnection 1420 through the dielectric layers. These interconnections 1420 may be similar to vias in semiconductor or other types of z-axis connection used in electronics packaging technology such as eyelets, Z clips, fuzz buttons and anisotropic conductive adhesive with only z-axis conductivity. Although FIG. 14 shows two levels, a multi-level article is not so limited, and may have three or more levels.

Figure 15:
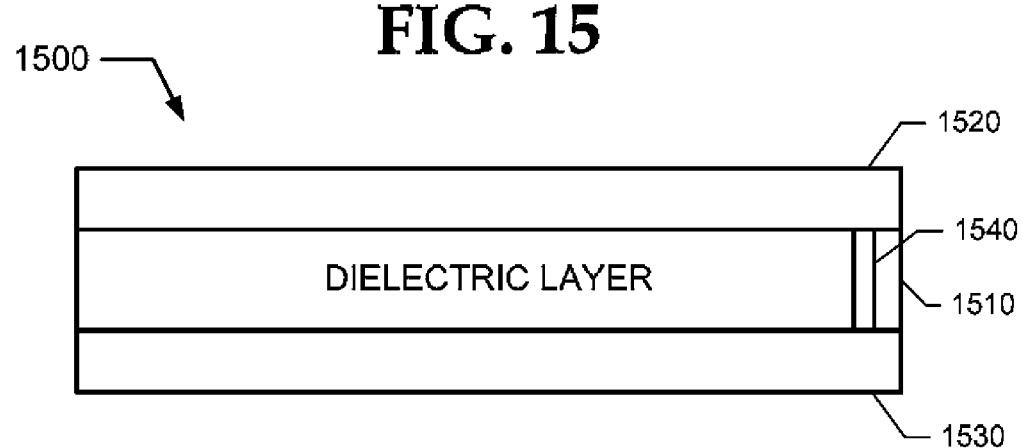

Reference is now made to FIG. 15, which illustrates another subassembly 1500. The subassembly 1500 of FIG. 15 has a single dielectric layer 1510 and metallization patterns 1520 and 1530 on both sides of the dielectric layer 1510. Communication lines 1540, for example similar to vias in semiconductors, extend between the metallization patterns 1520 and 1530.

FIG. 16 illustrates a wing 1600 similar to the wing 910a illustrated in FIG. 9a, except that the wing 1600 of FIG. 16 includes an epoxy-glass surface layer 1640 and a multi-level EME-P subassembly 1600 including a dielectric layer 1610 with metalized patterns 1620 and 1630 on opposite sides of the dielectric layer 1610.

FIG. 17 illustrates a wing 1700 similar to the wing 910a illustrated in FIG. 9a, except that the wing 1700 of FIG. 17 includes an epoxy-glass surface layer 1760 and a multi-level EME-P subassembly 1700 including first and second dielectric layers 1710 and 1720 with metalized patterns 1730, 1740 and 1750. One dielectric layer 1710 may be thicker than the other dielectric layer 1720 to improve handling characteristics of the multi-level EME subassembly 1700. The metalized patterns 1730-1750 may communicate with each other in z-axis direction through the intervening dielectric layers 1720 and 1730 by conductive vias or other suitable electronics packaging schemes. Additional levels may be used to provide greater connectivity, functionality, etc.

As suggested in FIGS. 16 and 17, the multi-level EME-P subassemblies may be co-cured with the wing. In other embodiments, however, the multi-level EME-P subassemblies may be attached (e.g., thermally bonded) to the skin of a fully assembled wing. An epoxy-glass surface may then be applied, followed by a paint system.

Figure 18:
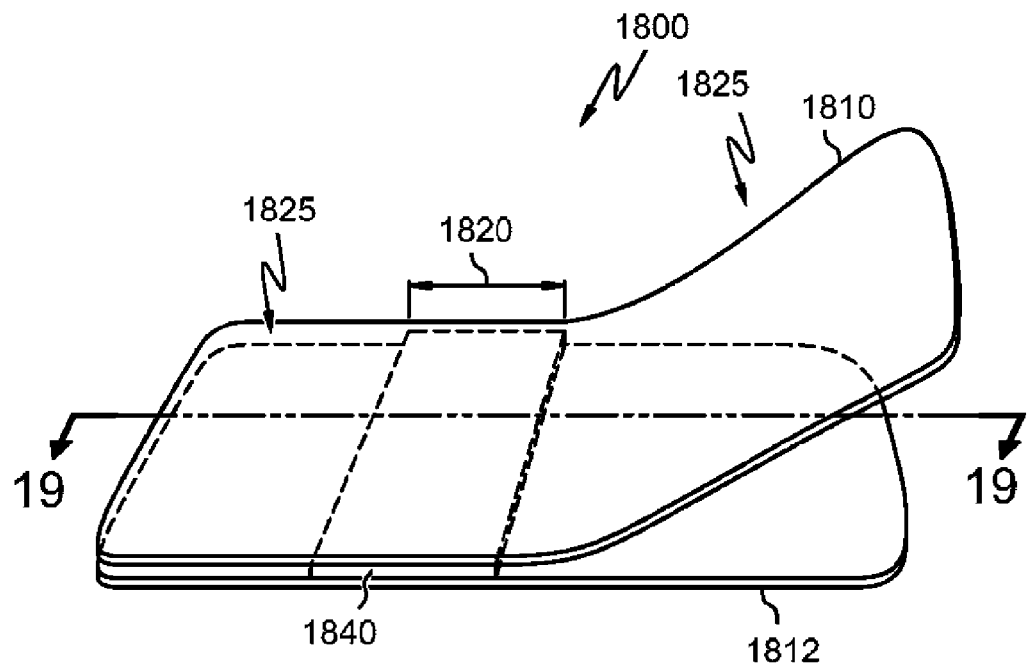
FIGS. 18 and 19 are illustrations of an example of an H-clip.
Figure 19:
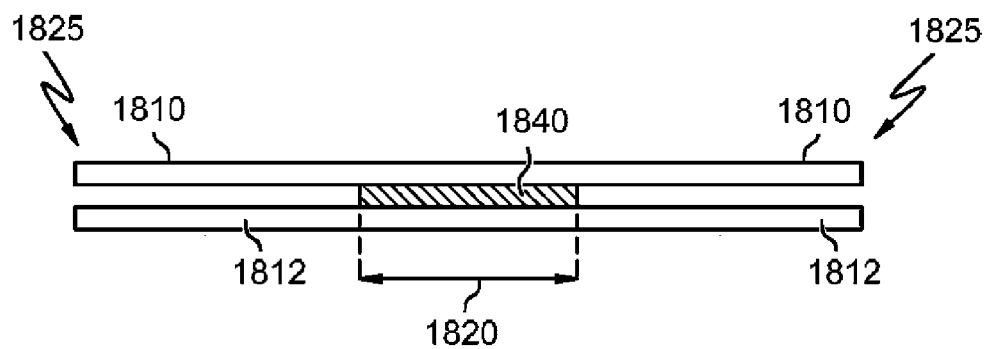

Reference is now made to FIGS. 18-19, which illustrate an example of an H-clip 1800 for joining together two-level patterns of EME-P articles during manufacture of an EME-P subassembly. An H-clip 1800 provides a convenient positive locking mechanism for joining two articles The H-clip 1800 maintains electrical conductivity between adjoining levels while still maintaining electrical isolation between top and bottom layers.

The H-clip 1800 includes first and second conductive layers 1810 and 1812 (backed by substrates) that are separated by a transversely extending layer of dielectric material 1840. The dielectric material 1840 forms a central region 1820. The two conductive layers 1810 and 1812 are substantially co-extensive, and they should desirably be aligned with the conductive layers of the EME-P articles being joined or repaired. Thus, the conductive layers 1810 and 1812 may be made of copper, aluminum, silver, gold, nickel or other conductive metal and have the same thickness as the metalized patterns (e.g., 0.0014 to 0.003 in. thick). The H-clip 1800 may have additional conductive layers, depending upon the number of levels in the EME-P articles being joined or repaired. The two conductive layers 1810 and 1812 at the central region 1820 do not peel apart. However, end portions 1825 of the conductive layers 1810 and 1812 can be peeled back and spread apart. A suitable adhesive may be applied on inboard surfaces of the peeled-back portions 1825. The end portions 1825 are configured to overlap with and adhere to metalized patterns of an EME-P articles being joined together.

Figure 20:
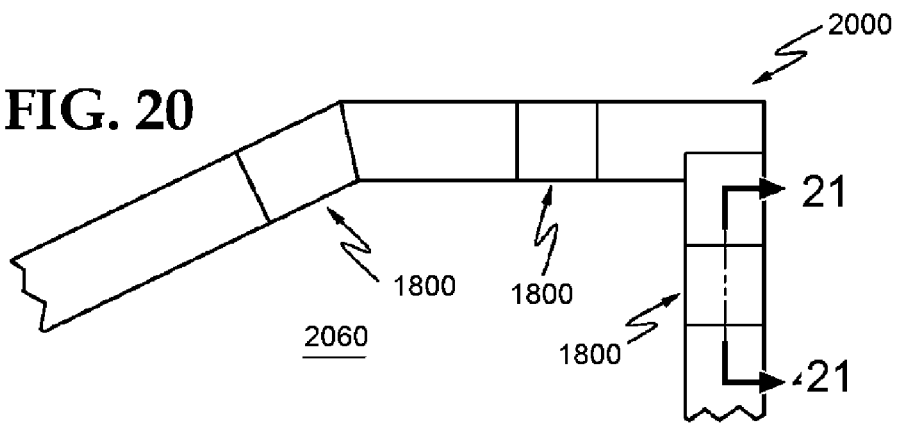
FIGS. 20 and 21 are illustrations of a section of a multilevel EME-P subassembly with several H-clips.
Figure 21:
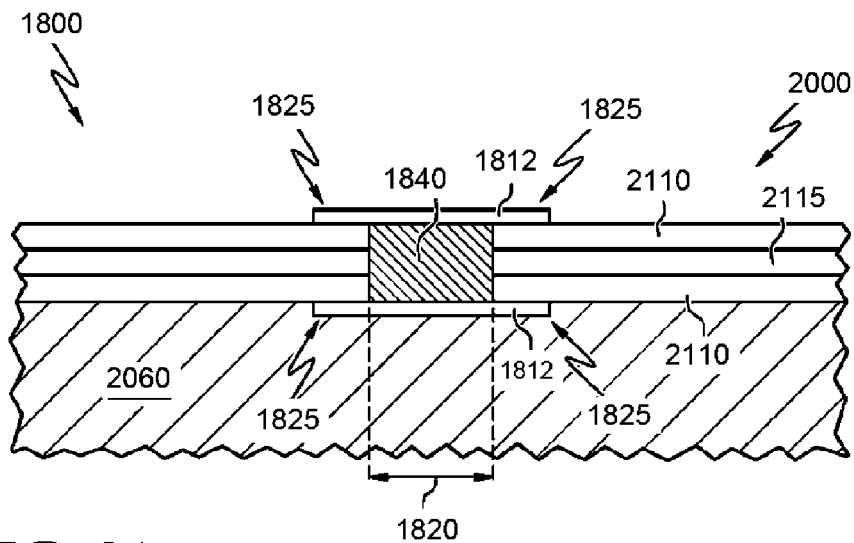

FIGS. 20 and 21 illustrate a section of a multilevel EME-P subassembly 2000 with a number of H-clips 1800. The multi-level EME-P subassembly 2000 is laid onto, or integrated into, a composite surface 2060. As shown in FIG. 21, the multi-level EME-P subassembly 2000 includes a pair of metalized patterns 2110 separated by a dielectric layer 2115. The H-clip 1800 is inserted into the subassembly area to be joined such that the end portions 1825 overlap onto each of the pair of metalized patterns 2110 of the subassembly 2000 on each side of the area to be joined or repaired. This overlap establishes a degree of electrical continuity in each of the two metalized patterns 2110 of the subassembly 2000 via the intervening electrically conductive layers 1810 and 1820 of the H-clip 1800. Electrical isolation of the conductive layers 2110 from each other, if desired, is preserved by the layer of dielectric material 1840 of the H-clip 1800.

A damaged EME-P subassembly can be repaired. A standard repair patch may be used to repair a damaged EME-P subassembly.

Figure 22:
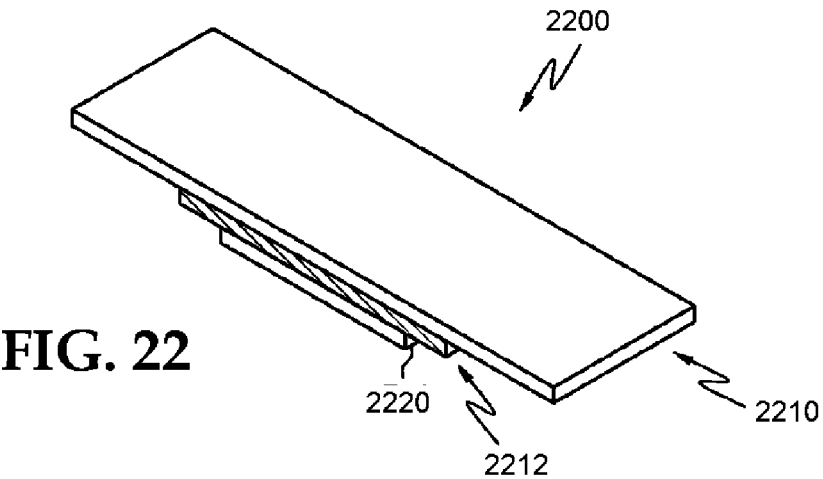
FIG. 22 is an illustration of a standard repair patch.

FIG. 22 illustrates a standard repair patch 2200 for a two-conductor EME-P subassembly. The standard repair patch 2200 has an upper conductive layer 2210 and a lower conductive layer 2220 that are separated by a central dielectric region 2212. The standard repair patch 2200 has a stepped layer configuration such that the lower conductive layer 2220 has the shortest length, the upper conductive layer 2210 has the longest length, and the central dielectric region 2212 has an intermediate length.

Figure 23:
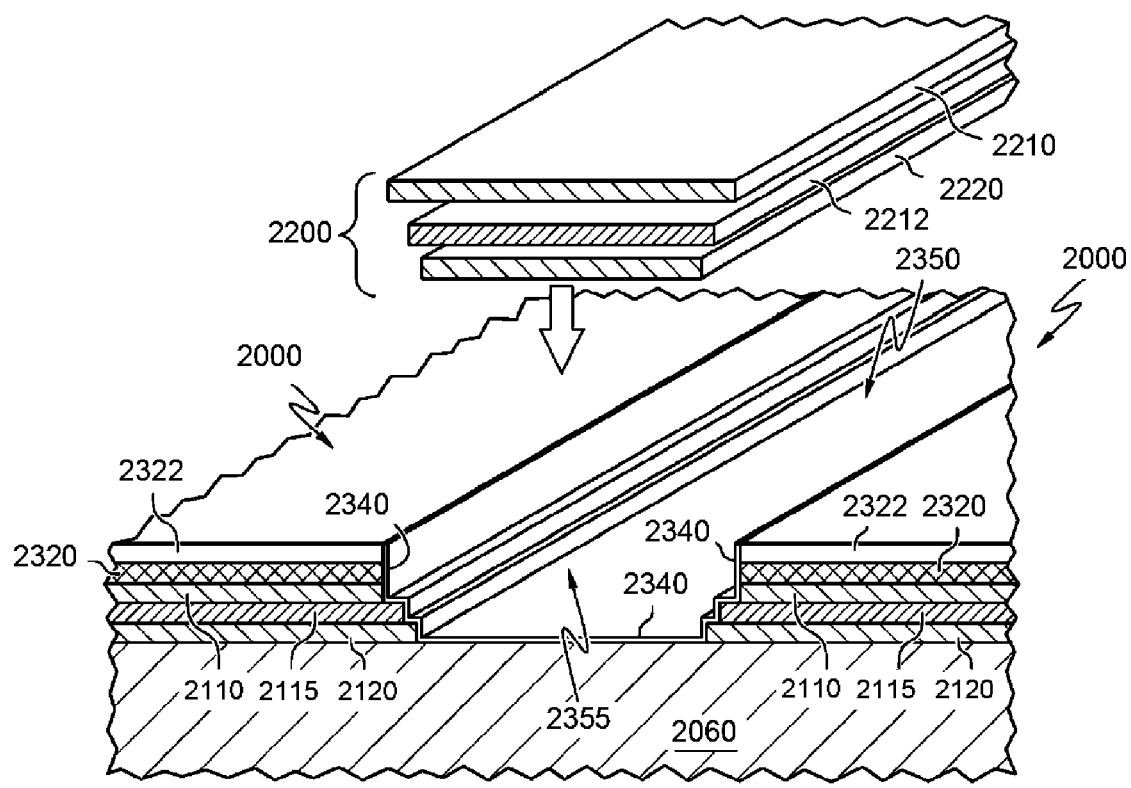
FIG. 23 is an illustration of repairing an EME protection subassembly with the standard repair patch of FIG. 22.

Reference is now made to FIG. 23, which illustrates how the standard repair patch 2200 of FIG. 22 can be used to repair an area 2350 of a multi-level EME-P subassembly 2000. The area 2350 to be repaired may be prepared by precisely cutting at its perimeter to produce a stepped layer configuration 2355. Such stepped cutting may be carried out with, for example, a precision router tool. Desirably, this cutting produces a configuration that precisely registers with the stepped layer configuration of the standard repair patch 2200. In addition, the perimeter of the standard repair patch 2200 may be precision cut so the layers of the patch 2200 register precisely with the layers of the area 2350 to be repaired.

To secure the standard repair patch 2200 to the subassembly 2000, a suitable adhesive should be applied to either the patch 2200 or to the stepped layer configuration 2355 of the area 2350 to be repaired. For example, a thin adhesive in the form of a flexible prepreg 2340 is applied to the stepped configuration 2355. The flexible prepreg 2340 may include a carrier and an adhesive applied to and impregnating the carrier. For example, the carrier may be a glass fiber cloth and the adhesive may be any suitable adhesive. Such adhesives may include, for example, B-staged epoxy film or liquid epoxy resin where the subassembly 2000 includes copper layers with a polyimide dielectric between them. The standard repair patch 2200 is then placed into the stepped layer configuration 2355 such that conductive layers 2210 and 2220 of the patch 2200 register with and are coextensive with conductive layers of the subassembly 2000. Once the subassembly 2000 has been repaired, a glass epoxy surface layer 2320 and paint system 2322 can be applied.

The invention claimed is:

1. A pre-fabricated article for a composite aircraft component, the component having a plurality of electromagnetic effects (EME) protection areas, the article consisting of a metal-dielectric laminate, the laminate including:
   a dielectric layer; and
   a pre-fabricated metalized pattern on the dielectric layer, the metalized pattern having open portions and solid metal portions that are fabricated on the dielectric layer prior to integration with the component so that when integrated with the aircraft component, the solid metal portions divert EME current away from the EME protection areas of the aircraft component, wherein thickness of metal in the metalized pattern is reduced as the pattern extends away from an EME protection area.

2. The article of claim 1, wherein the dielectric layer is flexible prior to integration with the component.

3. The article of claim 1, wherein the metalized pattern is custom-designed.

4. The article of claim 1, wherein the metalized pattern is a single foil.

5. The article of claim 1, wherein the metalized pattern is a patterned metal foil.

6. The article of claim 1, wherein the metalized pattern has a thickness of no more than a few thousands of an inch.

7. The article of claim 1, wherein the dielectric layer is also designed to provide an outer layer of aircraft skin structure.

8. The article of claim 1, further comprising a metalized pattern on an opposite side of the dielectric layer.

9. The article of claim 1, wherein the solid metal portions include traces for providing electrical connectivity for multi-function applications aboard an aircraft.

10. A subassembly for an aircraft component; the subassembly including a plurality of articles of claim 1, the articles joined together to provide EME protection for the aircraft component, the articles joined prior to integration with the component.

11. The subassembly of claim 10, wherein the subassembly has the shape and configuration of the aircraft component prior to integration with the aircraft component.

12. The subassembly of claim 10, wherein the protection areas are areas from which EME current will be diverted and distributed.

13. The subassembly of claim 10, further comprising at least one additional level of articles.

14. The subassembly of claim 10, wherein H-clips are used to join the articles together.

15. A method of manufacturing the subassembly of claim 10, comprising using photoimaging and pattern etching to create a pattern in a plurality of metallic laminates; joining the patterned metal laminates together; and sealing the joined laminates.

16. A method of manufacturing the article of claim 1, comprising using photoimaging and pattern etching to create the pattern in a metallic laminate; and sealing the patterned metallic laminate.

17. An aircraft component comprising a composite subassembly integrated with an EME protection (EME-P) subassembly including at least one article of claim 1.

18. The aircraft component of claim 17, wherein the EME-P subassembly includes a single article for providing EME protection.

19. The aircraft component of claim 17, wherein the EME-P subassembly includes a plurality of articles having custom shapes for covering curved portions, specific contours, and complex surfaces.

20. The aircraft component of claim 19, wherein the dielectric layer of the EME-P subassembly also functions as an outermost layer of skin structure.

21. The aircraft component of claim 19, wherein the articles are arranged in multiple levels.

22. The aircraft component of claim 19, further comprising H-clips for joining the articles together.

23. A method of fabricating the aircraft component of claim 17, comprising:
   laying out at the EME-P subassembly on a surface of a tool with the dielectric against the tool surface;
   laying composite material on the article; and
   co-curing the subassembly and the composite material.

24. The method of claim 23, further comprising finishing an exposed surface of the dielectric layer.

25. A method of fabricating the aircraft component of claim 17, comprising bonding the EME-P subassembly to a cured composite subassembly, with the dielectric layer exposed.

26. The method of claim 25, further comprising finishing the exposed surface of the dielectric layer.

27. A method of fabricating the aircraft component of claim 17, comprising applying the EME-P subassembly to a cured composite subassembly as appliqué.

28. A pre-fabricated subassembly for a major aircraft component having a plurality of flight-critical components; the subassembly including a plurality of articles joined together to provide electromagnetic effects (EME) protection for the major aircraft component, the articles joined prior to integration with the major aircraft component, each article consisting of a metal-dielectric laminate including a dielectric layer and a pre-fabricated metalized pattern on the dielectric layer, the metalized pattern having open portions and solid metal portions that divert lightning current away from the flight critical components.

29. The subassembly of claim 28, wherein the major aircraft component includes a composite skin having holes for metal fasteners; and wherein the solid metal portions of the subassembly provide EME protection for metal fasteners in the holes by diverting and distributing current away from the metal fasteners in the holes.

30. The subassembly of claim 29, wherein the skin is a wing skin, the skin defining a fuel tank; and wherein EME protection is provided for fasteners extending into the fuel tank.

* * * * *